(12) United States Patent
Kanematsu

(10) Patent No.: US 8,770,558 B2
(45) Date of Patent: Jul. 8, 2014

(54) PAD FOR LEAF SPRING

(75) Inventor: Tsunefumi Kanematsu, Yokohama (JP)

(73) Assignee: NHK Spring Co., Ltd, Yokohoma-shi (JP)

( * ) Notice: Subject to any disclaimer, the term of this patent is extended or adjusted under 35 U.S.C. 154(b) by 166 days.

(21) Appl. No.: 13/000,424

(22) PCT Filed: Jun. 25, 2009

(86) PCT No.: PCT/JP2009/061594
§ 371 (c)(1),
(2), (4) Date: Dec. 21, 2010

(87) PCT Pub. No.: WO2010/004878
PCT Pub. Date: Jan. 14, 2010

(65) Prior Publication Data
US 2011/0095456 A1 Apr. 28, 2011

(30) Foreign Application Priority Data
Jul. 9, 2008 (JP) ................................. 2008-178791

(51) Int. Cl.
*F16F 1/18* (2006.01)
(52) U.S. Cl.
USPC .................. 267/48; 267/36.1; 267/47; 267/49
(58) Field of Classification Search
USPC ........................... 267/47, 45, 48, 49, 52, 36.1; 280/124.17
See application file for complete search history.

(56) References Cited

U.S. PATENT DOCUMENTS

| | | | | |
|---|---|---|---|---|
| 2,815,945 A * | 12/1957 | Green | ............................. | 267/45 |
| 2,861,798 A * | 11/1958 | Lenet et al. | ..................... | 267/45 |
| 4,750,718 A | 6/1988 | Nickel | | |
| 5,251,886 A * | 10/1993 | Bursel | .......................... | 267/229 |
| 6,264,231 B1 | 7/2001 | Scully | | |
| 6,371,466 B1 * | 4/2002 | Spears | ......................... | 267/265 |

FOREIGN PATENT DOCUMENTS

| | | |
|---|---|---|
| DE | 42 33 106 A1 | 5/1993 |
| DE | 4233106 A1 * | 5/1993 |
| JP | U-56-023735 | 3/1981 |

(Continued)

OTHER PUBLICATIONS

International Search Report in International Application No. PCT/JP2009/061594; dated Aug. 11, 2009.

(Continued)

Primary Examiner — Thomas J Williams
Assistant Examiner — Mariano Sy
(74) Attorney, Agent, or Firm — Oliff PLC

(57) ABSTRACT

A curved portion, with a curved cross section, is formed at the recess of the pad. The curved portion has a contact portion which contacts the leaf spring's tension surface, which faces the curved portion. The curved portion's thickness decreases from the contact portion to an end portion of the curved portion, thereby being spaced from the leaf spring's tension surface. In the pad, the height of the curved portion of the recess is set such that contact of the leaf spring's tension surface and the corner portion of the end portion of the curved portion can be avoided when the stroke length of the leaf spring's end portion is at maximum. Thus, the tension surface of the leaf spring is not worn by the corner portion of the end portion of the curved portion. As a result, breakage of the leaf spring caused by wear can be prevented.

4 Claims, 3 Drawing Sheets

(56) References Cited

FOREIGN PATENT DOCUMENTS

| JP | 60220233 A | * | 11/1985 | ................... 267/148 |
| JP | A-60-231036 | | 11/1985 | |
| JP | A-61-157843 | | 7/1986 | |
| JP | Y2-04-046098 | | 10/1992 | |
| JP | U-05-022881 | | 3/1993 | |
| JP | A-2001-343277 | | 12/2001 | |

OTHER PUBLICATIONS

Oct. 31, 2011 European Search Report issued in European Patent Application No. 09794324.5.

Oct. 2, 2012 Office Action issued in European Application No. 09 794 324.5.

* cited by examiner

PAD FOR LEAF SPRING

TECHNICAL FIELD

The present invention relates to a pad for leaf springs, the pad being disposed between leaf springs laminated and used in vehicle suspensions. In particular, the present invention relates to an improvement in a shape of a pad facing a tension surface of the leaf spring.

BACKGROUND ART

In vehicles (trucks or the like), when rear side axle, which is a driving axle, has two axles, a trunnion suspension is used as a suspension for the rear side axle (see, for example, U.S. Pat. No. 6,264,231). As shown in FIG. 4, there is a rubber mount type using a rubber mount in trunnion suspensions. FIG. 4 is a schematic side view showing a structure of a trunnion suspension 1. In the trunnion suspension 1, leaf springs 11 to 13 are laminated and used on axles 5 and 6 of tires 3 and 4 at a rear side.

As shown in FIG. 4, pads 14 are provided between both end portions of the leaf springs 11 and 12. A predetermined interval is provided between end portions of the leaf springs 12 and 13. When stroke length of the leaf spring 12 positioned under the leaf spring 13 is equal to or greater than a predetermined length, the end portion of the leaf spring 13 contacts that of the leaf spring 12, and starts stroking. Rubber mounts 21 and 22 having a cornice shape are provided between the leaf spring 11 and the axle 5 and between the leaf spring 11 and the axle 6.

U-shaped bolts 31 and 32 holding the leaf springs 11 to 13 are disposed at center portions of the leaf springs 11 to 13. Nuts 33 and 34 are fastened at leading end portions of the U-shaped bolts 31 and 32 on a pad 41 disposed on a surface of the leaf spring 13. Support portions of trunnion sheet 42 supporting the leaf springs 11 to 13 are disposed between bottoms of the U-shaped bolts 31 and 32 and a lower surface of the leaf spring 11. A trunnion shaft 43 is disposed at a lower side of the leaf spring 11 between the U-shaped bolts 31 and 32. The trunnion shaft 43 is fixed at a bracket 44 via a hole of a main body portion of the trunnion sheet 42. The bracket 44 is fixed on a vehicle body 2.

In this trunnion suspension 1, shocks are applied from a road surface to the tires 3 and 4, and the shocks are transmitted to the leaf springs 11 to 13 through the axles 5 and 6 and the rubber mounts 21 and 22. The leaf springs 11 to 13 rotate around the trunnion shaft 43, and are elastically supported by the rubber mounts 21 and 22 on the axles 5 and 6, so that shock transmission to the vehicle body 2 is relieved.

In the pads 14 between both end portions of the leaf springs 11 and 12, as shown in FIGS. 5A to 5C, recesses are formed at center portions of both surfaces, and surfaces of the recesses are flat surfaces 14A. The leaf springs 11 and 12 shown in FIG. 4 are disposed on the flat surfaces 14A of the recesses. Bolt holes 14B are formed at projections of both end portions of the pad 14, and bolts are penetrated into the bolt holes 14B and are fastened by nuts on plates (not shown in the Figure) of upper portions of the rubber mounts 21 and 22. In the action of the trunnion suspension 1, the leaf springs 11 and 12, which contact the flat surfaces 14A of the recesses of both surfaces of the pad 14, stroke in an upper direction shown in FIG. 4. In this case, upper surfaces of the leaf springs 11 to 13 are compression surfaces, and lower surfaces thereof are tension surfaces.

However, in stroking of the leaf spring 12, local wear may occur on the tension surface (the lower surface) of the leaf spring 12 due to a corner portion of the left end portion side (the center portion side of the leaf spring 12) of the flat surface 14A of the pad 14. Although the wear portion of the leaf spring 12 is not a weakest stress portion, as shown in FIG. 6, the wear portion may early initiate breakage of the leaf spring 12. FIG. 6 shows a condition of a breakage portion 12A at the right side end portion of the tension surface of the leaf spring 12, and reference numeral 12B denotes a starting point of breakage.

DISCLOSURE OF THE INVENTION

An object of the present invention is to provide a pad for leaf springs, which can prevent breakage of a leaf spring that may be caused by wear.

According to one aspect of the present invention, a pad for leaf spring, which is disposed between leaf springs laminated and used in vehicle suspensions, includes: a curved portion which is formed on a surface facing a tension surface of the leaf spring and projects toward the tension surface, wherein the curved portion has a contact portion which contacts the tension surface of the leaf spring, and the curved portion has a thickness which is reduced from the contact portion to a center portion side of the tension surface, thereby being spaced from the tension surface.

In the pad for leaf springs of the aspect according to the present invention, the curved portion has a thickness which is reduced from the contact portion to a center portion side of the tension surface, thereby being spaced from the tension surface in an initial condition. Therefore, the curvature radius of the curved portion is appropriately adjusted, so that the contact of the tension surface of the leaf spring and the corner portion of the above center portion side end portion of the curved portion of the pad can be avoided even when the stroke length of the end portion of the leaf spring is at maximum in the stroking of the leaf spring which is disposed so as to face the pad. Therefore, since the tension surface of the leaf spring is not worn by the corner portion of the above center portion side end portion of the curved portion of the pad, breakage of the leaf spring, which may be caused by wear, can be prevented. As a result, the durability of the leaf spring can be improved.

The pad for leaf springs of the present invention can use various structures. According to a preferable embodiment according to the present invention, the thickness of the curved portion may be reduced from the contact portion to an end portion side opposite to the center portion side of the tension surface, thereby being spaced from the tension surface. In this embodiment, the curved portion of the pad can smoothly contact the tension surface of the end portion the leaf spring in the stroking of the leaf spring.

According to the present invention, the curvature radius of the curved portion, which is spaced from the tension surface by reducing the thickness of the curved portion, is appropriately adjusted, so that the contact of the tension surface of the leaf spring and the corner portion of the above center portion side end portion of the curved portion of the pad can be avoided even when the stroke length of the leaf spring is at maximum in the stroking of the leaf spring disposed so as to face the pad, and another effect can be obtained.

BRIEF DESCRIPTION OF THE DRAWINGS

FIG. 2A is a top view, FIG. 2B is a right surface view seen from the arrow direction 1B of FIG. 2A, and FIG. 2C is a side view seen from the arrow direction 1C of FIG. 2A.

FIG. 5A is a top view, FIG. 5B is a right surface view seen from the arrow direction 5B of FIG. 5A, and FIG. 5C is a side view seen from the arrow direction 5C of FIG. 5A.

EXPLANATION OF REFERENCE NUMERALS

Figure 1:
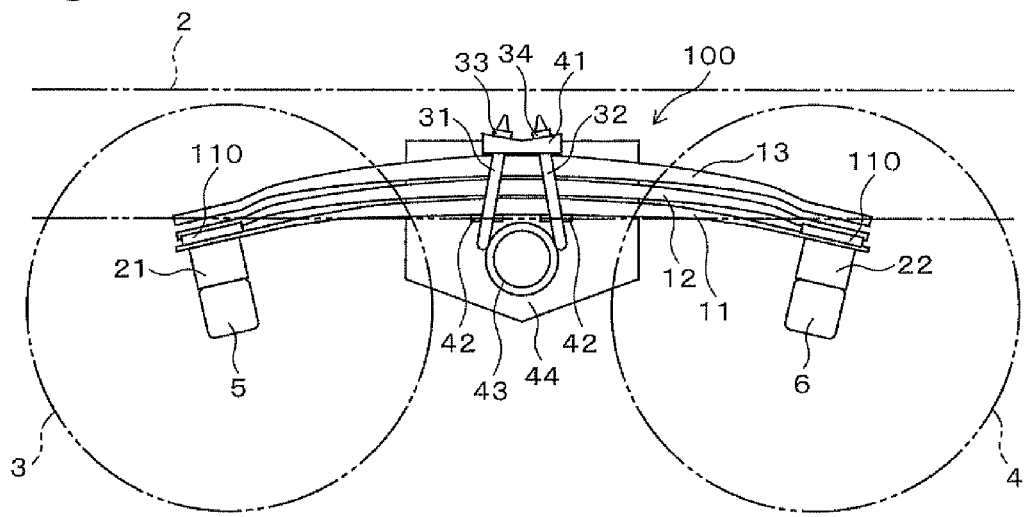
FIG. 1 is a schematic side view showing a structure of a rubber mount type trunnion suspension using a pad for leaf springs of one embodiment according to the present invention.

Reference numerals 11 and 12 denote a leaf spring, 110 denotes a pad (pad for leaf springs), 123 denotes a curved portion, and 123A denotes a contact portion.

BEST MODE FOR CARRYING OUT THE INVENTION

1. Structure of Embodiment

Figure 2A:
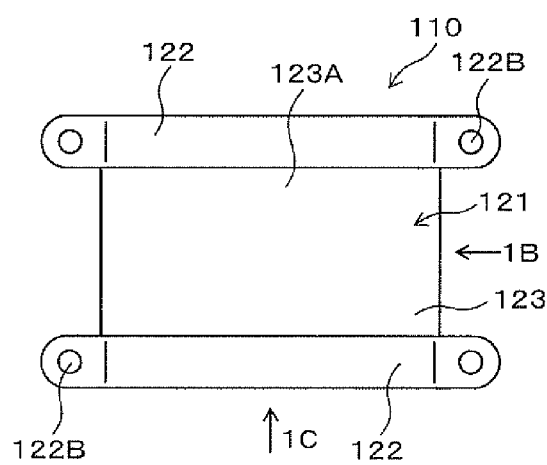
FIGS. 2A to 2C show an enlarged structure of a pad for leaf springs of one embodiment according to the present invention.
Figure 2B:
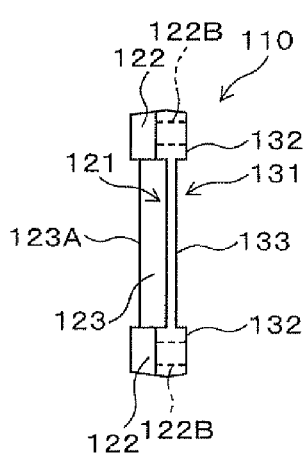
Figure 2C:
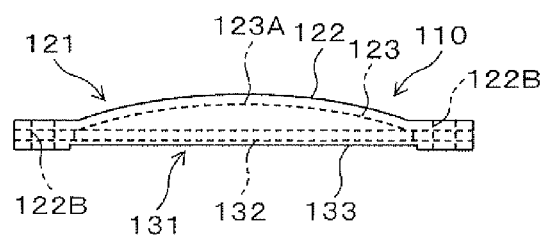
Figure 4:
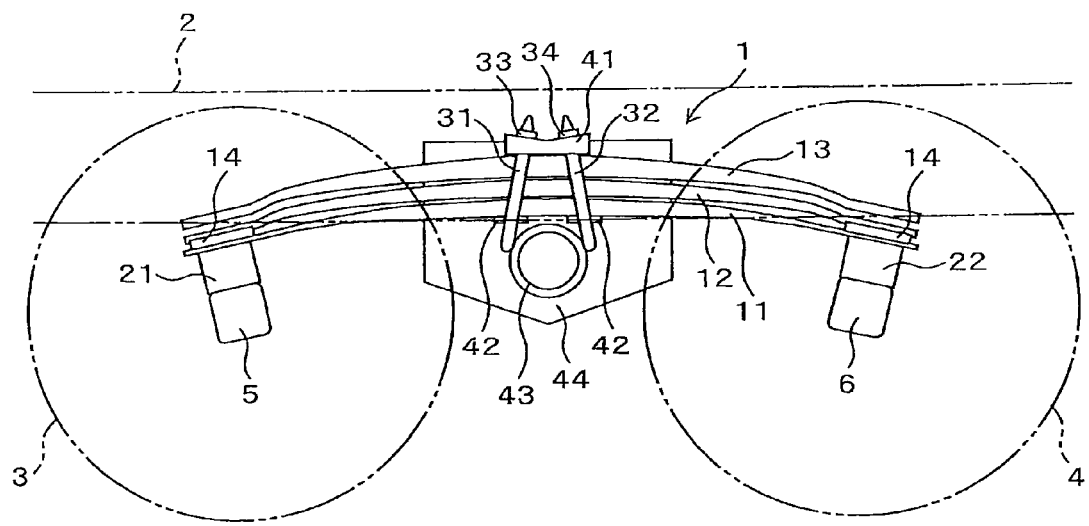
FIG. 4 is a schematic side view showing a structure of a rubber mount type trunnion suspension using a conventional pad for leaf springs.
Figure 5A:
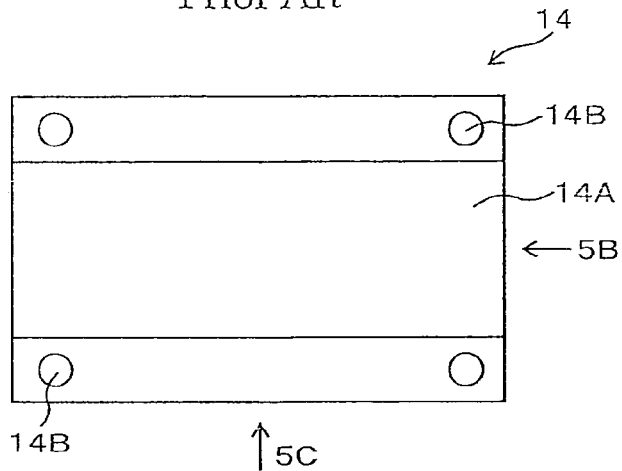
FIGS. 5A to 5C show an enlarged structure of a conventional pad for leaf springs.
Figure 5B:
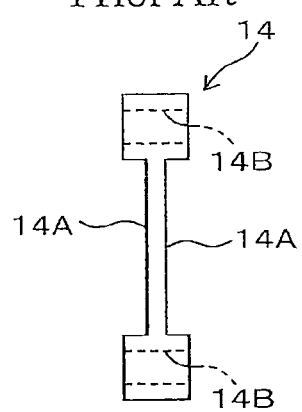
Figure 5C:
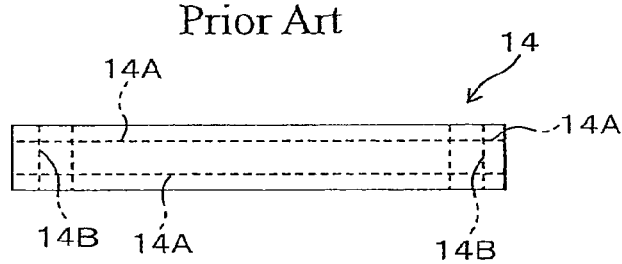
Figure 6:
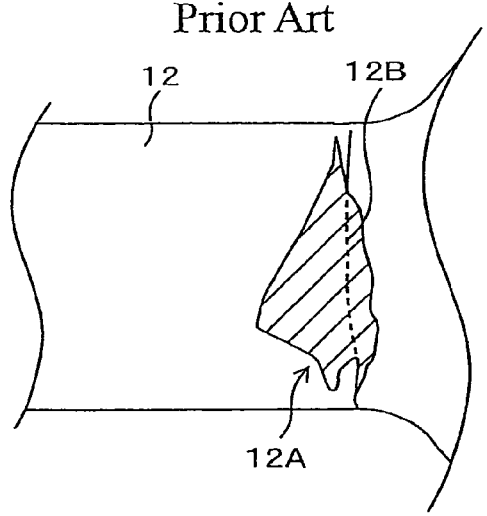
FIG. 6 is a schematic diagram showing a structure of breakage portion of the conventional leaf spring.

One embodiment of the present invention will be explained hereinafter with reference to the Figures. FIG. 1 shows a rubber mount type trunnion suspension 100 using a pad 110 of one embodiment according to the present invention. FIGS. 2A to 2C show an enlarged structure of the pad 110 shown in FIG. 1. FIG. 2A is a top view, FIG. 2B is a right surface view seen from the arrow direction 1B of FIG. 2A, and FIG. 2C is a side view seen from the arrow direction 1C of FIG. 2A. The trunnion suspension 100 shown in FIG. 1 is different from the trunnion suspension 1 in using the pad 110 instead of the pad 14 in FIG. 4, and the trunnion suspension 100 has the same structure as that of the trunnion suspension 1 except for this difference. Thus, in the trunnion suspension 100, the same components as in the trunnion suspension 1 will be denoted by the same numerals as in the trunnion suspension 1, and the explanation thereof will be omitted.

For example, as shown in FIG. 1, the pads 110 are disposed between both end portions of leaf springs 11 and 12. For example, as shown in FIGS. 2A to 2C, a recess 121, which faces a tension surface (lower surface in FIG. 1) of the leaf spring 12, is formed on a surface of the pad 110. Projections 122 are formed at both sides of the recess 121. A recess 131, which faces a compression surface (upper surface in FIG. 1) of the leaf spring 11, is formed on a rear surface of the pad 110. Projections 132 are formed at both sides of the recess 131.

A curved portion 123, which has a curved cross section, is formed at the recess 121. The curved portion 123 is disposed so as to face the tension surface of the leaf spring 12. The curved portion 123 has a contact portion 123A which contacts the tension surface of the leaf spring 12 in an initial condition. The curved portion 123 has a thickness which is reduced from the contact portion 123A to both end portions of the curved portion 123, and the curved portion 123 is thereby spaced from the tension surface of the leaf spring 12. In the curved portion 123, a portion from the contact portion to an end portion opposite to a center portion side of the tension surface may not have a curved cross section, and the portion may have various shapes.

A surface of the recess 131 is a flat surface 133. If necessary, the recess 131 and the projections 132 may have the same curved cross sections as those of the recess 121 and the projections 122. Bolt holes 122B are foamed at the projections 122 and 132. Bolts are penetrated into the bolt holes 122B and are fastened by nuts on plates of upper portions of the rubber mounts 21 and 22.

The contact portion 123A has a height from the end portion, which is a bottom point of the curved portion 123, to the contact portion 123A, which is a top point of the curved portion 123. The height is set as follows by appropriately adjusting a curvature radius of the curved portion 123. That is, the height of the curved portion 123 is set such that contact of the tension surface of the leaf spring 12 and a corner portion of the end portion of the curved portion 123 can be avoided during presetting of leaf spring in production. The height of the curved portion 123 is set such that contact of the leaf spring 12 and the corner portion of the end portion of the curved portion 123 can be avoided when the stroke length of the end portion of the leaf spring 12 is at maximum.

2. Action of Embodiment

Figure 3:
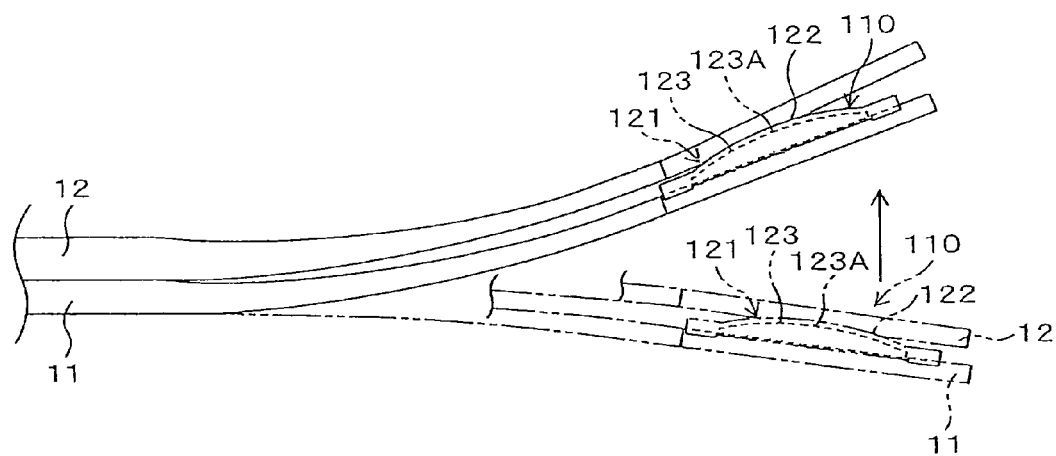
FIG. 3 is an enlarged schematic side view showing a portion structure of a condition of the pad for leaf springs in an initial condition of a right end portion of the leaf spring shown in FIG. 1 and a portion structure of a condition of the pad for leaf springs at maximum stroke length of the leaf spring.

A condition of the pad 110 in action of the leaf spring 12 will be explained primarily with reference to FIG. 3. FIG. 3 is an enlarged schematic side view showing a portion structure of a condition of the pad 110 in an initial condition of the leaf springs 11 and 12 and a portion structure of a condition of the pad 110 in action of the leaf springs 11 and 12. In FIG. 3, right portions of the leaf springs 11 and 12 in FIG. 1 are shown, and components other than the leaf springs 11 and 12 and the pad 110 are not shown. The pads 110 at the left side and the right side in FIG. 1 perform the same action, and the action explanation of the pad 110 at the left side in FIG. 1 will be omitted.

In an initial condition, as shown by the two-dot chain line in FIG. 3, the pad 110 is disposed between the leaf springs 11 and 12, and only the contact portion 123A contacts the tension surface (lower surface in FIG. 3) of the leaf spring 12. When a load is applied on the leaf springs 11 and 12 from the axle 6 shown in FIG. 1 through the rubber mount 22, the right end portions of the leaf springs 11 and 12 perform stroking upwardly around the trunnion shaft 43. In this case, the tension surface of the right end portion of the leaf spring 12 bends toward the curved portion 123 of the recess 121 of the pad 110, and the tension surface thereof smoothly contacts along the shape of the curved portion 123 from the contact portion 123A of the recess 121 to the left side.

In the pad 110 of this embodiment, since the height of the curved portion 123 of the recess 121 is set such that contact of the tension surface of the leaf spring 12 and the corner portion of the left end portion of the curved portion 123 can be prevented when the stroke length of the right end portion of the leaf spring 12 is at maximum, the tension surface of the leaf spring 12 is not worn by the corner portion of the left end portion of the curved portion 123.

As described above, in this embodiment, the curvature radius of the curved portion 123, which is disposed so as to face the tension surface of the leaf spring 12, is appropriately adjusted. Thus, the contact of the tension surface of the leaf spring 12 and the corner portion of the end portion of the curved portion 123 of the pad 110 can be avoided even when the stroke length of the end portion of the leaf spring 12 is at maximum in the stroking of the leaf spring 12. Therefore, since the tension surface of the leaf spring 12 is not worn by the corner portion of the end portion of the curved portion 123 of the pad 110, breakage of the leaf spring 12, which may be caused by wear, can be prevented. As a result, the durability of the leaf spring 12 can be improved.

In particular, since the curved portion 123 of the pad 110 extends such that the thickness of the curved portion 123 is reduced from the contact portion 123A to the end portion opposite to the center portion side of the tension surface, the curved portion 123 of the pad 110 can smoothly contact the tension surface of the leaf spring 12 in the stroking of the leaf spring 12.

The invention claimed is:

1. A pad for leaf springs, which is disposed between laminated leaf springs and used in vehicle suspensions, the pad being disposed between a first leaf spring and a second leaf spring, the first leaf spring being adjacent to the second leaf spring, comprising:
 a curved portion which is formed on a surface facing a tension surface of the second leaf spring and projects toward the tension surface, wherein
 the curved portion has a contact portion which contacts the tension surface of the second leaf spring,
 the curved portion has a thickness which is reduced from the contact portion to a center portion side of the tension surface, thereby being spaced from the tension surface, and
 the tension surface of the second leaf spring is a surface which undergoes increasing tension stress as a vehicle load applied to the second leaf spring increases.

2. A pad for leaf springs according to claim 1, wherein the thickness of the curved portion is reduced from the contact portion to an end portion side opposite to the center portion side of the tension surface, thereby being spaced from the tension surface.

3. A laminated structure of leaf springs comprising:
 laminated leaf springs in a vehicle suspension; and
 a pad disposed between the leaf springs at both end portions of the leaf springs, the pad being disposed between a first leaf spring and a second leaf spring, the first leaf spring being adjacent the second leaf spring, the pad comprising:
 a curved portion which is formed on a surface facing a tension surface of the second leaf spring and projects toward the tension surface, wherein:
 the curved portion has a contact portion which contacts the tension surface of the second leaf spring,
 the curved portion has a thickness which is reduced from the contact portion to a center portion side of the tension surface, thereby being spaced from the tension surface, and
 the tension surface of the second leaf spring is a surface which undergoes increasing tension stress as a vehicle load applied to the second leaf spring increases.

4. A vehicle suspension comprising the vehicle suspension recited in claim 3.

* * * * *